No. 734,529. PATENTED JULY 28, 1903.
H. G. FISKE.
ELASTIC VEHICLE TIRE.
APPLICATION FILED MAY 17, 1899.
NO MODEL. 2 SHEETS—SHEET 1.
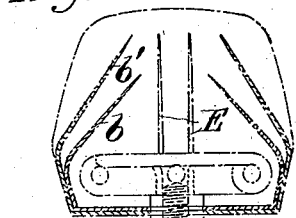
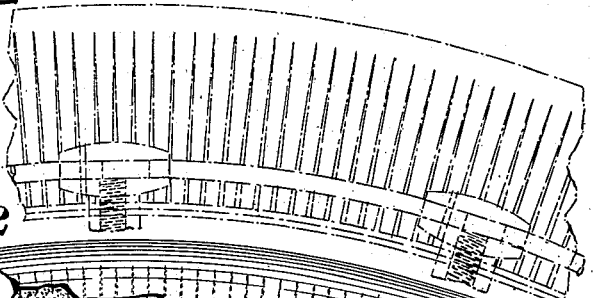
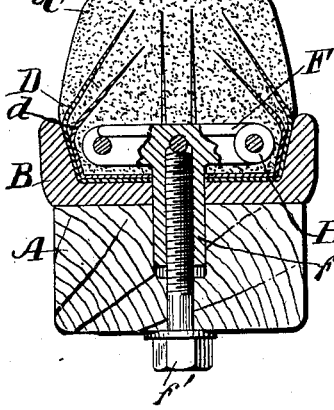
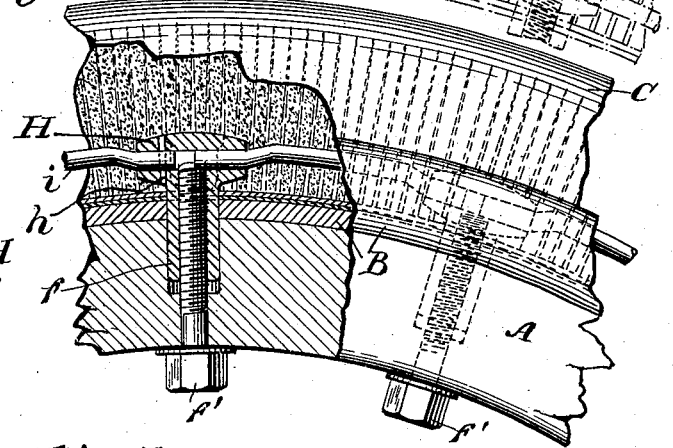
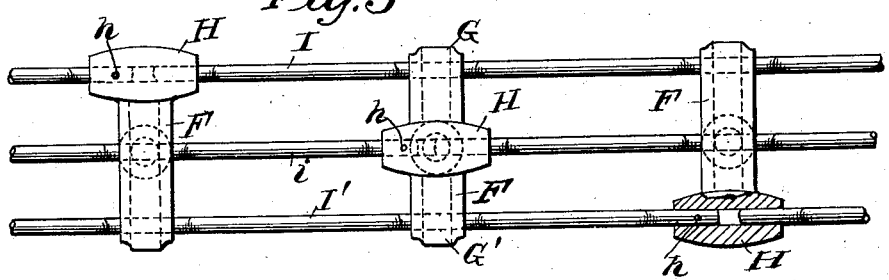
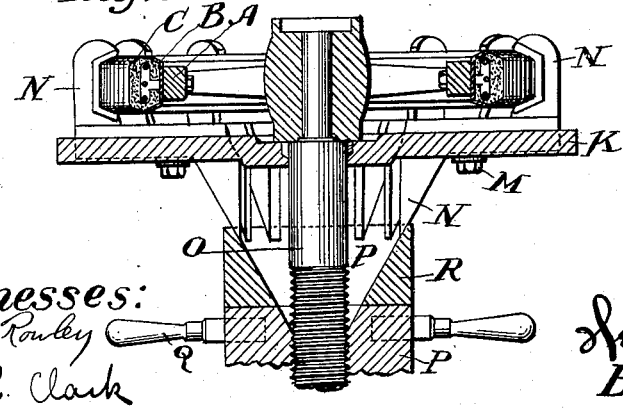
Witnesses:
Geo. B Rowley
M. L. Clark
Inventor
Henry G. Fiske
By Hermann P. Kuntz
his Attorney.
THE NORRIS PETERS CO., PHOTO-LITHO., WASHINGTON, D. C.

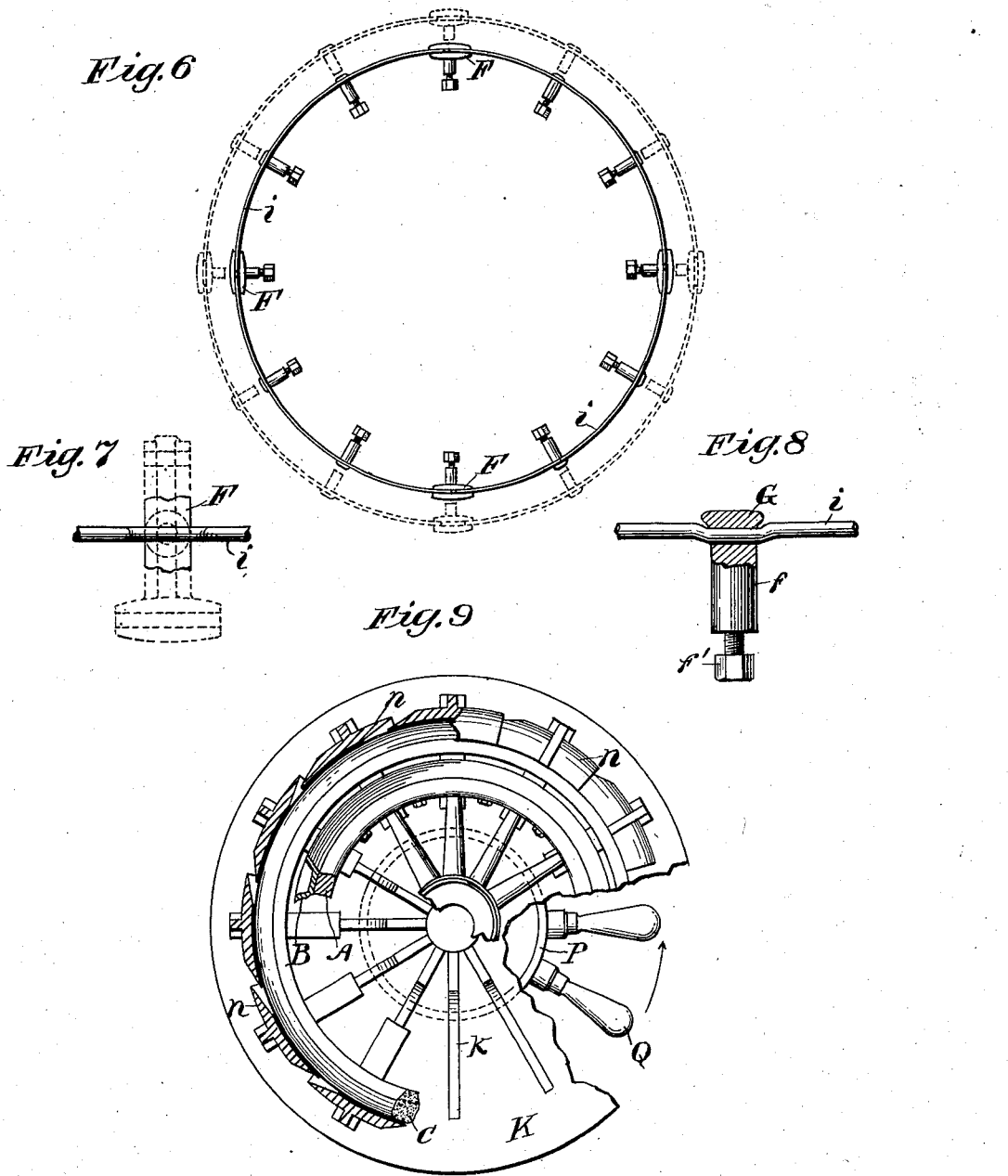

No. 734,529. Patented July 28, 1903.

UNITED STATES PATENT OFFICE.

HENRY G. FISKE, OF NEW YORK, N. Y., ASSIGNOR, BY MESNE ASSIGNMENTS, TO ELECTRIC VEHICLE COMPANY, OF JERSEY CITY, NEW JERSEY, AND NEW YORK, N. Y., A CORPORATION OF NEW JERSEY.

ELASTIC VEHICLE-TIRE.

SPECIFICATION forming part of Letters Patent No. 734,529, dated July 28, 1903.

Application filed May 17, 1899. Serial No. 717,225. (No model.)

*To all whom it may concern:*

Be it known that I, HENRY G. FISKE, a citizen of the United States of America, and a resident of the city of New York, county of New York, and State of New York, have invented certain new and useful Improvements in Elastic Vehicle-Tires, of which the following is a specification.

My present invention relates to elastic tires for vehicles, and particularly to the means for attaching such tires to the rim in which they are held, said rim being also attached to the felly of the wheel.

Additional features of invention relate to the construction of the tire itself and to the method of attaching same to the rim.

In the accompanying drawings, Figure 1 is a transverse sectional elevation of the tire, rim, felly, and attaching devices. Fig. 1$^a$ is a view of the tire shown in Fig. 1 in dotted lines, the same showing the relative diameter of the tire before it is compressed into the rim. Fig. 2 is a view in elevation, partly in section, of the tire, rim, and felly of Fig. 1. Fig. 2$^a$ is a view in dotted lines similar to Fig. 1$^a$ illustrative of the locking wires and clamps, as in Fig. 2, but before compression. Fig. 3 is a plan view of the locking wires and clamps by which the tire is secured to the rim. Fig. 4 is a view in elevation, partly in section, showing the tire-compressing apparatus after the tire has been compressed into position; and Fig. 5 is a detailed view of one of the radially-moving arms of the tire-compressing machine. Fig. 6 is an edge view of the locking-wires for securing the tire to the rim, the first position being indicated in dotted lines and the final position in full lines. Fig. 7 is a detailed plan view of one of the locking-clamps, partly in dotted lines. Fig. 8 is a view in elevation, partly in section, also showing one of the clamps and locking-wires. Fig. 9 is a plan view, partly broken away, showing the apparatus for compressing the tire upon the wheel.

As indicated in the drawings, A is the felly of the wheel, to which spokes are attached in any usual or convenient manner.

B is a metal rim, which is securely attached to the felly A and is formed with a channel to receive the tire C.

The tire C is made solid and of elastic material, as rubber, and its lower portion, which is seated in the rim B, is covered with one or more layers of fabric D $d$, said fabric being lapped inward and projecting radially outward and incorporated in the body of the tire in the form of loose-woven threads or strands $b\ b'$. Additional strands E may also be carried up through the center of the tire in order to add strength thereto. The general arrangement of these threads is with a view of strengthening the rubber and prevent its being easily torn, especially along the line of binding-wires. For ordinary vehicle-tires of an elastic nature a good quality of rubber possesses sufficient strength to withstand the usual wear and tear; but where employed for tractive purposes severe tensile strains are exerted which tear the rubber away from the fastenings, and slight cuts and other injuries are greatly extended unless checked by a reinforcement similar to that shown.

The tire C is attached to the rim and felly by clamps F, which are T-shaped, having a head extending transversely of the tire and embedded therein and an internally-screw-threaded shank $f$, extending outwardly from the tire and adapted to pass through suitable openings in the rim and into the felly. Screw-bolts $f'$ are passed through the exterior of the felly into engagement with screw-threads in the shanks F to draw the same downward and to clamp the tire firmly in position.

The tire C may be made in straight lengths, the ends of which are subsequently united by any suitable cement, or it (the tire) may be made in a continuous piece; but, however constructed, it is made somewhat larger than the rim B, as indicated in Figs. 1$^a$, 2$^a$, and is compressed into place, and thereby reduced in diameter and its resiliency increased. The clamps F are each provided with ways for three locking-wires, one at each side and one in the middle, equidistant. Two of the wire-engaging parts of each clamp G G' may be simple apertures therethrough or notches at its underside, while the third, H, is in the form of a tubular connector adapted to receive the ends of the wires. The wires I i I' are formed in sections, the ends of which are fitted into the connectors H, and one end of each wire is attached thereto by pin h or other suitable means, and when the tire is made these ends are some distance apart to allow for them coming together when the tire is compressed into the rim. Each locking-wire is preferably made in several sections, so that the amount of slip necessary to accommodate the compression in the tire will be absorbed in the several spaces between the ends of the wires.

The tire may be compressed into the rim by any suitable apparatus, but I have illustrated a form of machine adapted to the purpose. This is shown in Figs. 4, 5, 9, in which K is a base-plate formed with radial slots k. A number of arms L are arranged upon the plate K and provided with ribs l at their lower sides adapted to move in the slots k, and each arm is provided with a bolt and nut M to hold it in position upon the bed-plate K. At the inner end of each of the arms L is a downwardly-depending wedge-block N. At the outer end of each of the arms L is a segmental clamp n. A screw-threaded spindle O is secured at the under side of the bed-plate K, and upon said spindle is a vertically-moving block R, having a conical opening p in its interior, said opening being adapted to receive the extremities of the wedge-blocks N. The block R is moved up and down with respect to the wedge-blocks N by means of a screw-threaded block or nut P upon the spindle O, upon which nut the block R is carried. Suitable handles Q are attached to the nut P, so that it can be turned to raise and lower block R.

In operation the wheel, comprising the felly A, rim B, and suitable spokes and hub, is laid upon the bed-plate, and the tire C, which is then larger than the wheel, as indicated in Fig. 9, is placed exterior thereto, the tread of the tire resting in the clamps N, which have been separated by lowering the block R. As the block R is moved upward the clamps are brought together and the tire is compressed into position in the rim B. As this operation takes place the shanks f enter suitable sockets in the rim and felly, and when the tire has been compressed into place the free ends of the wires I i I' are at the same time forced farther into the clamps H, so that when the bolts f' are set up in the shanks f the said clamps will act to draw down the wires to some extent, slightly crimping them at points where they are engaged by the clamps, and not only holding them from radial displacement, but also acting to prevent the said wires from moving longitudinally in the clamps, and thereby effectually preventing expansion and loosening of the tire.

Where, as previously, a tire has been made with a binding or locking wire vulcanized in place and in a straight piece which is joined before or after being placed upon the wheel, it usually happens that the compression is localized and becomes intense at some points and almost nothing elsewhere about the tire. A particular feature of my invention is to avoid uneven pressure upon the elastic tire as the result of compression, and this is secured largely by making the locking-wires in sections, the ends of which move toward each other when the tire is compressed together with the arrangement of locking-clamps which hold the wires equidistant and secure a large basis of support within the body of the tire itself.

While I have described my invention in detail, various minor modifications and changes may be made in view of the foregoing without departing from the invention.

Having described my invention, what I claim is—

1. The combination with a solid tire of elastic material, of a plurality of sectional locking-wires embedded therein and clamps engaging said wires also embedded in the tire, said clamps being formed with tubular connectors for uniting the ends of the sectional wires.

2. The combination with a solid tire of elastic material constructed of larger diameter than the wheel to which it is to be fitted, of contractible locking-bands embedded in the tire, and locking-clamps engaging said bands and also embedded within the tire and having shanks extending therefrom for engagement with the rim of the wheel.

3. The combination with a solid tire of elastic material, of a plurality of sectional locking-wires embedded therein, clamps engaging said wires and also embedded in the tire, said clamps forming tubular connectors for uniting the sectional wires, one of the wires being fastened in the clamp and the other one free to move endwise therein.

4. The combination with a solid tire of elastic material, of a plurality of sectional locking-wires embedded therein, clamps engaging said wires and also embedded in the tire, said clamps being formed with tubular connectors for uniting the ends of the sectional wires and with parts adapted to engage the continuous portions of the locking-wires.

5. The combination with a compressible solid tire of elastic material, contractile locking-bands embedded within the tire, clamps engaging the locking-wires and embedded in the tire and having shanks extending therefrom for engagement with the rim of the wheel, said clamps being adapted to crimp the locking-wires when in final position.

6. The combination with an elastic tire of solid material, locking-wires embedded therein and being free to move longitudinally of the tire, clamps engaging the locking-wires and also embedded in the tire, and means for compressing the tire into place upon the wheel and thereby connecting the ends of the locking-wires in the clamps.

7. The combination with the rim of a wheel, of a solid tire of elastic material provided with locking-wires embedded therein but free to move longitudinally within the tire when the same is reduced in diameter by compression, and clamps engaging said wires and also embedded within the tire and having screw-threaded shanks extending from the tire and adapted to engage draw-bolts in the rim of the wheel whereby when said clamps are in final position, they are drawn forward so as to crimp the locking-wires and prevent lateral movement thereof.

8. In combination with a rim, a solid tire therefor of elastic material and normally of greater diameter than the rim, sectional wires embedded in the tire, clamps adapted to engage the wires, shanks extending from the clamps into the rim, means for compressing the tire into the rim and threading the wires through the clamps and draw-bolts for engaging and drawing down the shanks when the tire has been compressed into the rim.

Signed by me at New York, N. Y., this 12th day of May, 1899.

HENRY G. FISKE.

Witnesses:
  J. S. DE SELDING,
  FRANKLAND JANNUS.